United States

Babish

4,106,856

Aug. 15, 1978

[54] STRAY LIGHT CONTROL IN AN OPTICAL SYSTEM

[75] Inventor: Richard Constantine Babish, Wilton, Conn.

[73] Assignee: The Perkin-Elmer Corporation, Norwalk, Conn.

[21] Appl. No.: 851,100

[22] Filed: Nov. 14, 1977

Related U.S. Application Data

[63] Continuation of Ser. No. 702,778, Jul. 6, 1976, abandoned.

[51] Int. Cl.² ............................................. G02B 17/08
[52] U.S. Cl. .................................................. 350/199
[58] Field of Search ......................................... 350/199

[56] References Cited

U.S. PATENT DOCUMENTS 2,409,971  10/1946  Bennett .......................... 350/199 X
2,726,574  12/1955  Mandler .......................... 350/199

*Primary Examiner*—Paul A. Sacher
*Attorney, Agent, or Firm*—Salvatore A. Giarrantana; Francis L. Masselle; Edwin T. Grimes

[57] ABSTRACT

In an optical system having a mirror system for reflecting light from a field of interest to form a desired image on sensitive material disposed in a focal plane, the improvement characterized by the provision of a centrally located obscuration disposed adjacent the front of a mirror for intercepting light reflected from the sensitive material toward the mirror to prevent reflection from the mirror of said light reflected from the sensitive material from reilluminating the sensitive material, to thereby improve the contrast the desired image.

1 Claim, 4 Drawing Figures

STRAY LIGHT CONTROL IN AN OPTICAL SYSTEM

This is a continuation of application Ser. No. 702,778, filed July 6, 1976 now abandoned.

BACKGROUND OF THE INVENTION

Correction of flare in mirror systems, particularly those intended for daylight photography, has always been a difficult problem, especially when it is necessary to point toward a bright source, such as the sun, for example. Heretofore, attempts have been made to overcome this problem by the use of a series of baffle cones, the placement of baffle rings, and the treatment of the glass edges and bevels, for example. While these procedures have improved the situation, they have not been entirely successful, as will become apparent as the description proceeds.

SUMMARY OF THE INVENTION

In order to accomplish the desired results, this invention provides new and improved stray light control means: in an optical system having a mirror system for reflecting light from a field of interest to form a desired image on sensitive material disposed in a focal plane. The improvement of this invention is directed to the concept of providing a centrally located obscuration adjacent the front of a mirror for intercepting light reflected from the sensitive material toward the mirror to prevent reflection from the mirror of said light reflected from the sensitive material from forming a secondary image on the sensitive material, to thereby improve the contrast in the desired image.

According to one aspect of the invention, the obscuration is a spot applied to the surface of the mirror, and according to another aspect thereof, the reflection from the sensitive material includes a diffuse component and a specular component. Further, according to still another aspect, the size of the obscuration is determined as a function of the flare correction of the light reflected from the sensitive material and the vignetting of useful light. Moreover, in one form of the invention, the optical system is a solid catadioptric system and the aforesaid mirror is the secondary mirror thereof.

DETAILED DESCRIPTION OF THE PREFERRED EMBODIMENT

Figure 1:
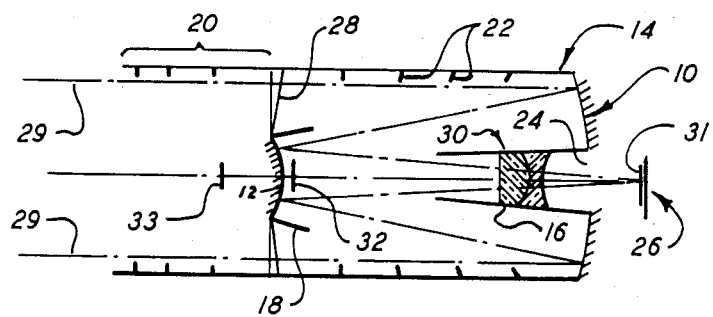
FIG. 1 is a schematic representation of a two mirror optical system employing the concepts of the invention.

Referring to the drawings, FIG. 1 illustrates a two mirror system displaying the more basic features of a solid catadioptric system, employing the concepts of the present invention. It comprises a primary mirror 10 and a secondary mirror 12 mounted in a tube 14 with suitable baffles, including an inner primary baffle 16, a secondary baffle 18, forebaffles 20 and a series of inwardly directed tube baffles 22. The mirrors together form an image through a hole 24 in the primary mirror 10 at a focal plane indicated at 26, behind the primary mirror. The secondary mirror 12 is shown mounted in a spider 28, although in a solid catadioptric system or so-called solid "cat", and in other forms as well, it may be mounted in a glass element or it may even be a portion thereof. Such solid catadioptric systems are described in U.S. Pat. No. 3,547,525 issued Dec. 15, 1970 and in U.S. Pat. No. 3,926,505 issued Dec. 16, 1975.

In operation, a ray 29 enters the system from the field of interest and passes through the spider 28 to the primary mirror 10 where it is reflected back to the secondary mirror 12, and thence reflected back through a conventional lens system indicated generally at 30 to a film 31 or other sensor in the image plane 26. It will be appreciated that in any photo or optical system, the sensitive material in the focal plane is not perfectly absorbing, and therefore if one were to look into the system, one could observe a more or less bright image on the sensitive material, reflecting light diffusely and/or specularly. This light, falling on a mirror surface, such as the secondary mirror 12, is reflected back to the focal plane, degrading the contrast. This can be better understood by noting that the focal plane can see itself reflected in the mirror, and that this image of itself acts as a secondary source of stray or unwanted light, that tends to reduce contrast in the desired image. Thus, the light illuminating the focal plane, both specular and diffuse components, form images in or near the secondary mirror. I have discovered that these secondary sources can be wholly or partially obscured by means of a black dot or spot 32, FIG. 1, painted or placed close to the secondary mirror. Depending on the optical form of the system, some balance in the size and shape of this spot may be necessary to avoid vignetting of the useful light. In other forms of optical systems, a real image, or images, may be formed that are accessible, in which case the obscuration can be placed in the plane of the image.

For purposes of further explanation, it is useful to consider what elements are "seen" be each optical element, in turn. Insight into the sources of flare light then becomes more apparent.

Considering first the primary mirror 10, this mirror looks outwardly, or to the left as viewed in FIG. 1, and views the scene of interest, including some extra surroundings through the tube and baffles. It sees the back side of the baffles 20 and 22 and, if not properly designed, it may see light from the scene or surroundings reflected at glancing angles from the side walls of the tube 14. If so, some of these rays will coincide in direction with respect to some of the desired field points and will be imaged or directed into the field, causing degradation of contrast. Any directly illuminated baffle edge will be a source of diffracted light. In the event that all or a portion of this volume is occupied by glass elements, the edges of the glass are substituted for the walls, and hence, in the case of the solid catodioptric system, the glass edges must be carefully treated to avoid scattering or glancing angle reflections from the edges, which are very broad. It will be appreciated that glass edges typically are left ground, and sometimes black painting is omitted so that, as a result, a great deal of flare can originate here. Techniques applied to alleviate this problem include serrating or grooving the edges to simulate baffles (using the same design criteria), black painting the edges, and in particular using index matching absorptive edge coatings such as Luxorb to achieve a highly absorbent black edge. However, many edge blackening materials scatter a great deal of light, and at glancing angles almost any surface behaves somewhat specularly.

The primary mirror 10 also sees the secondary mirror 12, the back or indirectly illuminated portion of the spider 28 and the inside of the conical baffle 18 surrounding the secondary, if the system is provided with such a baffle. It also sees the outside of the conical baffle 16 extending from the hole 24 in the primary.

In the case of the solid catadioptric system, the space between the mirrors is filled with glass elements and the primary baffle is replaced by a blackened hole bored in one or more of the glass elements. All the precautions noted for baffles should be observed, and in addition, consideration should be given to the edges of the bevels and of any retainers that might be used for the glass elements.

The directions of the reflections from these elements should be carefully considered and indeed the actual angles should be engineered with this thought in mind.

Next, considering the secondary mirror 12, this mirror looks back at the primary mirror 10, and sees the field and its surroundings imaged by the primary mirror. Part of these surroundings include a view of the back side of the baffles and the side wall of the tube 14. Surrounding this it also sees the side walls of the tube 14 and its baffles 22, but now it sees the illuminated side. Even farther out, it sees the inside of the secondary conical baffle 18, from which light from the primary mirror may be somewhat specularly reflected. In the center of the primary mirror 10 it sees the image of the field as it illuminates the film 31 or other sensor in the image plane 26. This image will be more or less bright, and more or less specular, depending on the material surface properties of the sensitive material. Most photographic emulsions reflect an appreciable amount of the incident light. They are far from black and have a specular component, acting therefore, somewhat like a low quality mirror as far as stray light is concerned. Surrounding the field, the camera aperture can be seen which, while usually blackened, may have some specular characteristics. Surrounding this and extending to the edge of the center hole 24 in the primary mirror appears the inside or the outside of the primary baffle 16 depending on the viewpoint. Light from the primary mirror may be seen at glancing angles from the outside, and therefore, this central cone 16 should also be carefully baffled, a point often ignored because of the space and because treatment thereof is often inconvenient. Also, if the lens elements 30 are mounted towards the front, or left hand end as viewed in FIG. 1, of the conical baffle 16, care must be taken in treating the lens seat, for if it is smooth and unblackened, surrounding light of high brightness may be reflected specularly into the secondary mirror 12.

Finally, considering what is seen from the viewpoint of the focal plane 26, this aspect will be considered, for purpose of simplicity, from the viewpoint of the center of the field. Starting from the outside, there is seen some portion of the camera structure, mounting rings, and the inside of the conical baffling 16 extending through the hole 24 in the primary mirror, including the baffle rings or edge serrations as the case might be. This structure subtends by far the largest solid angle and therefore its brightness, relative to the outside world, must be held very low. Yet this structure is very close to the illuminated focal plane which, as indicated hereinbefore, is somewhat reflective and somewhat specular. The back sides of the baffles, the insides of the camera cavities, lens surfaces 30, walls and parts, the rearward facing lens seats, retainer rings, lens bevels, and the like (not shown), can be illuminated directly by the lens or by the images in the focal plane 26, constituting a large secondary source of light. This light can be reflected back into the picture area if these surfaces are not engineered and designed to minimize such occurrences by proper inclination, serration, and surface treatment, such as blackening, for example. The inner wall of the conical baffle 16 deserves particular attention because light from the secondary mirror can be reflected at grazing incidence into the field of interest. In this regard, it is often better, in the case of black paints, to use glossy black paints which will reflect the light in a controlled direction where it may be further attenuated rather than using a flat black paint which may diffusely reflect a small percentage thereof in all deviations.

Inside the primary baffle 16, it may be possible to see directly a portion of the tube 14 or forebaffle 20, or in an astronomical instrument or from an off-axis position, even a direct view of the outside world surrounding the field of interest, this latter being a direct source of stray light.

Figure 2:
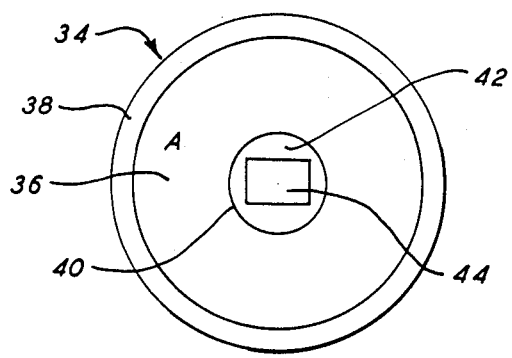
FIG. 2 is a representation of the appearance of images in the secondary mirror as viewed from the center of the image plane.

Next, the inside of the secondary baffle 18 and then the secondary mirror, itself, can be seen from the viewpoint of the focal plane 26, as illustrated in FIG. 2. Since the secondary mirror is a reflective optical element, other portions of the lens reflected within it can be seen. The edge of the secondary mirror is indicated at 34. The most prominent feature is an image of the primary mirror, itself, as indicated at 36, light from which forms the desired image at the focal plane. Surrounding this may be seen a portion of the inner wall of the lens barrel as indicated at 38, and just inside the central hole may be seen, depending on the field position, some portion of the outside of the inner primary baffle. Still further inside, in some designs, may be seen some of the inside of the inner primary baffle as indicated at 40. Inside this may be seen some of the lens mounting or camera structure and then the aperture plate as indicated at 42, which determines the shape and size of the picture region on the film. If any one of these elements is shiny or specular, non-image forming light will illuminate the field, thereby degrading the contrast.

Finally, in the event that the spot 32, FIG. 1, is not employed an image of the picture region or field itself, will be seen as indicated at 44, FIG. 2. This is a virtual image, usually located behind the secondary mirror, as indicated at 33 in FIG. 1, and thus it acts as a secondary source for reilluminating the entire field with stray light, depending on the reflectivity of the material of film 31 in the focal plane. The specular and diffuse portions of the reflected light behave somewhat differently and have different contributions.

Figure 3:
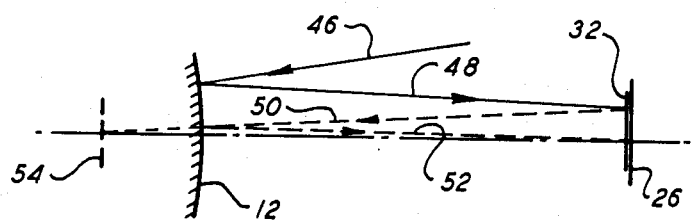
FIG. 3 is a schematic representation of the path of a typical light ray.

For the diffuse component, the secondary source has the average brightness of the field as imaged through the optics onto the film and reflected from it. FIG. 3 illustrates a typical ray path, wherein a direct ray from the primary mirror is indicated at 46, which is reflected off the secondary mirror and directed toward the film in the focal plane, as indicated at 48. The ray is then diffusely or specularly reflected from the film to the secondary mirror as indicated at 50, from which it is reflected back to the focal plane as indicated at 52, the virtual image of the focal plane being indicated at 54 behind the secondary mirror.

The desired image has an average illumination at the focal plane proportional to BA where B is the average brightness of the field of observation and A is the solid angle subtended at the image plane by the primary mirror. The brightness of the diffuse secondary source will be $BAR/\pi$ where R is the diffuse reflectance of the film and its constribution to the focal plane illumination is proportioned to $BARF/\pi$ where F is the solid angle subtended by the field as seen from the focal plane, considering no losses in the mirror and intervening optics for simplicity. The ratio of diffuse stray light to image forming light is therefore $RF/\pi$.

Figure 4:
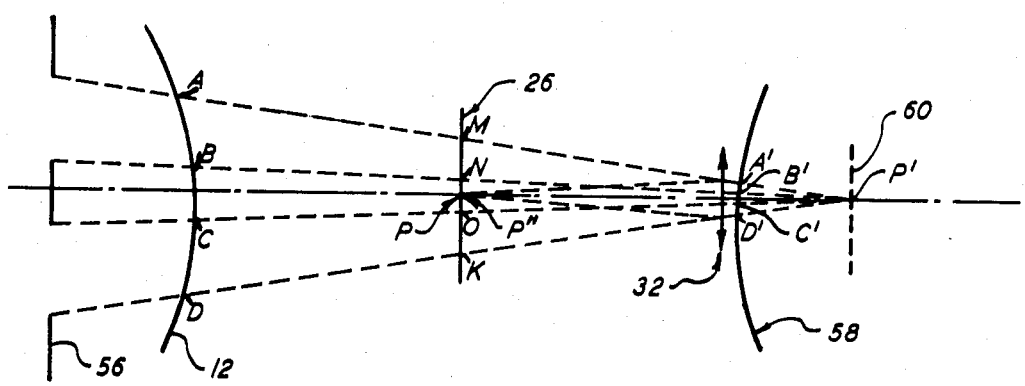
FIG. 4 is a representation of a typical ray path, illustrating the specular case, shown unfolded once about the film plane.

The specular component must be treated differently. FIG. 4 shows a typical ray path, illustrating the specular case, shown unfolded once about the film plane, wherein the image of the pupil from the primary mirror is indicated at 56, the image of the secondary mirror formed by the film in the focal plane being treated as a plane mirror as indicated at 58, and the image of the field in the secondary mirror is indicated at 60. A flare eliminating black spot, according to the invention, is positioned as indicated at 62. In this case, the film material is treated as a plan mirror of low reflectance, K, where K is greater than R. It can be seen that any ray from the exit pupil 56, reflected from the film plane 26, considered as a plane mirror, which will be directed toward the image of the focal plane 60 as seen by the secondary mirror, will illuminate the focal plane with stray light.

In this case only the field in the annular region M-N and O-K defined by the rays from the entrance pupil are effective in contributing to stray light at a point $p''$ (conjugate to P') in the focal plane. While this area of contribution is less than in the case of diffuse light, when the entire field contributed to stray light, it is also true that the diffuse reflectance coefficient can be very much lower than the spectral reflectance coefficient, depending on the film and the spectral and brightness composition of the scene. However, it is readily seen that the source of this stray light for both cases is or lies within the image of the illuminated picture aperture in the secondary mirror and it can be eliminated by a black spot shown imaged at 32 which can be painted on the image of the field stop as possible.

The ratio of stray light to image forming light is more complicated. It is proportional to the value of K times the ratio of the solid angles A'B'-D'C' to AB-CD without the factor $\pi$.

Since the second image of the pupil thus formed does not lie in the same surface as the black dot, the effects will vary as a function of the field angle. Thus, the location and size of the dot requires a careful balance between vignetting and flare correction.

While we have so far considered the film material as a specular reflector, it will be appreciated that surfaces of the optical elements 30 also behave as specular reflectors with more or less optical power, forming "ghost" images of the outside object field or the pupil in similar fashion.

The position and size of these ghosts will be a function of the optical power of the particular optical system readily determined by conventional raytracing techniques, but those disposed close to the secondary can be controlled by application of the black dot as before. The brightness of these ghosts will be a function of the surface reflectivity which can be further controlled with the application of low reflection coatings.

It will be appreciated that in other forms of optic systems, such as the Gregorian system for example, a real, accessible image may be formed by the light reflected from the focal plane, thereby permitting a more perfect solution, by the imposition of said black dot or spot.

Thus, a new and improved stray light control means for an optical system has been shown and described. Although specific embodiments have been illustrated and described, it will be obvious to those skilled in the art that various modifications may be made without departing from the spirit of the invention, which is intended to be limited solely by the appended claims.

What is claimed is:

1. A solid catadioptric photographic system comprising, in combination, a primary mirror for receiving rays of light from a field of interest and reflecting them to a spaced secondary mirror that, in turn, reflects the rays through a central hole in the primary mirror to sensitive material disposed on a focal plane behind said primary mirror, said primary mirror and said secondary mirror being mounted in a tube, an inner primary baffle means mounted adjacent said central hole, a conical secondary baffle mounted adjacent the parameter of said secondary mirror, a series of baffles inwardly directed from the walls of said tube between said primary and said secondary mirrors, and a series of inwardly directed forebaffles mounted on the walls of said tube extending from said secondary mirror towards the field of interest, means for treating the surfaces surrounding the path of the rays of light through the system to substantially reduce specularly the diffusely reflected stray light, a centrally located dark, obscuration disposed adjacent the front of said secondary mirror for intercepting light rays reflected from said sensitive materials towards said secondary mirror to prevent the reflection from said secondary mirror of said light reflected by the sensitive material from forming a secondary image on said sensitive material, the reflection from said sensitive material including a diffuse component and a specular component, the size of said dark obscuration being a function of the flare correction of the light reflected from said sensitive material and the vignetting of useful light, thereby improving the contrast in the desired image on said sensitive material.

* * * * *

UNITED STATES PATENT OFFICE
CERTIFICATE OF CORRECTION

Patent No. 4,106,856          Dated August 15, 1978

Inventor(s) Richard C. Babish

It is certified that error appears in the above-identified patent and that said Letters Patent are hereby corrected as shown below:

Column 5, line 2, Change "BA" to $--\overline{BA}--$.

Column 5, line 2, change "B" to $-\overline{B}--$.

Column 5, line 5, change "BAR" to $--\overline{BAR}--$.

Column 5, line 8, change "BARF" to $--\overline{BARF}--$.

Column 5, line 43, after "the" insert --middle of the secondary mirror covering or obscuring as much of the--.

Column 5, line 47, change "D'C'" to --C'D'--.

*Signed and Sealed this*

*First* Day of *January 1980*

[SEAL]

*Attest:*

SIDNEY A. DIAMOND

*Attesting Officer*      *Commissioner of Patents and Trademarks*